June 20, 1967 W. K. ENGLISH 3,327,290

DIAL SEQUENCE DETECTOR

Filed March 25, 1963 2 Sheets-Sheet 1

INVENTOR.
WILLIAM K. ENGLISH

BY Samuel Lindenberg

ATTORNEY

INVENTOR.
WILLIAM K. ENGLISH
BY Samuel Lindenberg
ATTORNEY

United States Patent Office 3,327,290
Patented June 20, 1967

3,327,290
DIAL SEQUENCE DETECTOR
William K. English, Menlo Park, Calif., assignor to AMP Incorporated, Harrisburg, Pa.
Filed Mar. 25, 1963, Ser. No. 267,460
5 Claims. (Cl. 340—167)

This invention relates to numeric sequence detectors and more particularly to an improved arrangement for a magnetic sequence detector.

An object of this invention is the provision of a sequence detector employing magnetic core logic.

Yet another object of the present invention is the provision of a sequence detector which may easily be changed to detect a desired sequence.

Still another object of the present invention is the provision of a novel and unique sequence detector using magnetic core logic.

Still another object of the present invention is to provide a magnetic core circuit arrangement whereby predetermined number sequences represented by pulse trains may be detected.

These and other objects of the present invention may be achieved in an arrangement wherein a predetermined number sequence wherein each number is represented as a pulse train may be detected. Each pulse train is successively fed into a first magnetic core shift register. A plug board is employed to connect outputs from the shift register corresponding to the different numbers in the predetermined sequence to be detected as inputs to a second magnetic core shift register which is designated as a digit register. The outputs from the first shift register which is hereafter designated as the number register, are applied to the digit register, by means of a plug board in the sequence in which it is desired that the numbers in the predetermined number sequence be detected.

A source of pulse trains, which may be derived from a pulse source or from an instrument such as a manually, dialable, source of pulses, is used to apply pulses to the number register. These serve to advance the set state of the first magnetic core in the number register to a following magnetic core having a position in the number register, corresponding to the number of pulses which have been applied thereto. At the end of the application to the number register of the first pulse train, a shift pulse is applied to the digit register to shift the set state of a magnetic core of the digit register to a succeeding magnetic core of the digit register, while all the cores of the first shift register are driven to their clear states. Such transfer will occur only if, by means of the plug board, the core having the set state in the number register which is being driven to its clear state has its output coupled together with the output of the core in the digit register to jointly drive the succeeding magnetic core in the digit register. Upon application of a second series of pulses to the number register, a core is set in the number register having a position corresponding in position to the number of pulses in said second pulse series. To advance the digit register again it is necessary that the output of the core in the digit register, which is in its set state, be "Anded" by means of the plug board with the output of the aforementioned core in the number register. In this manner the set state of a core in the digit register is advanced through the digit register to the last core therein only if the pulse train sequence applied to the number register has the proper number of pulses and also occurs in the proper sequence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
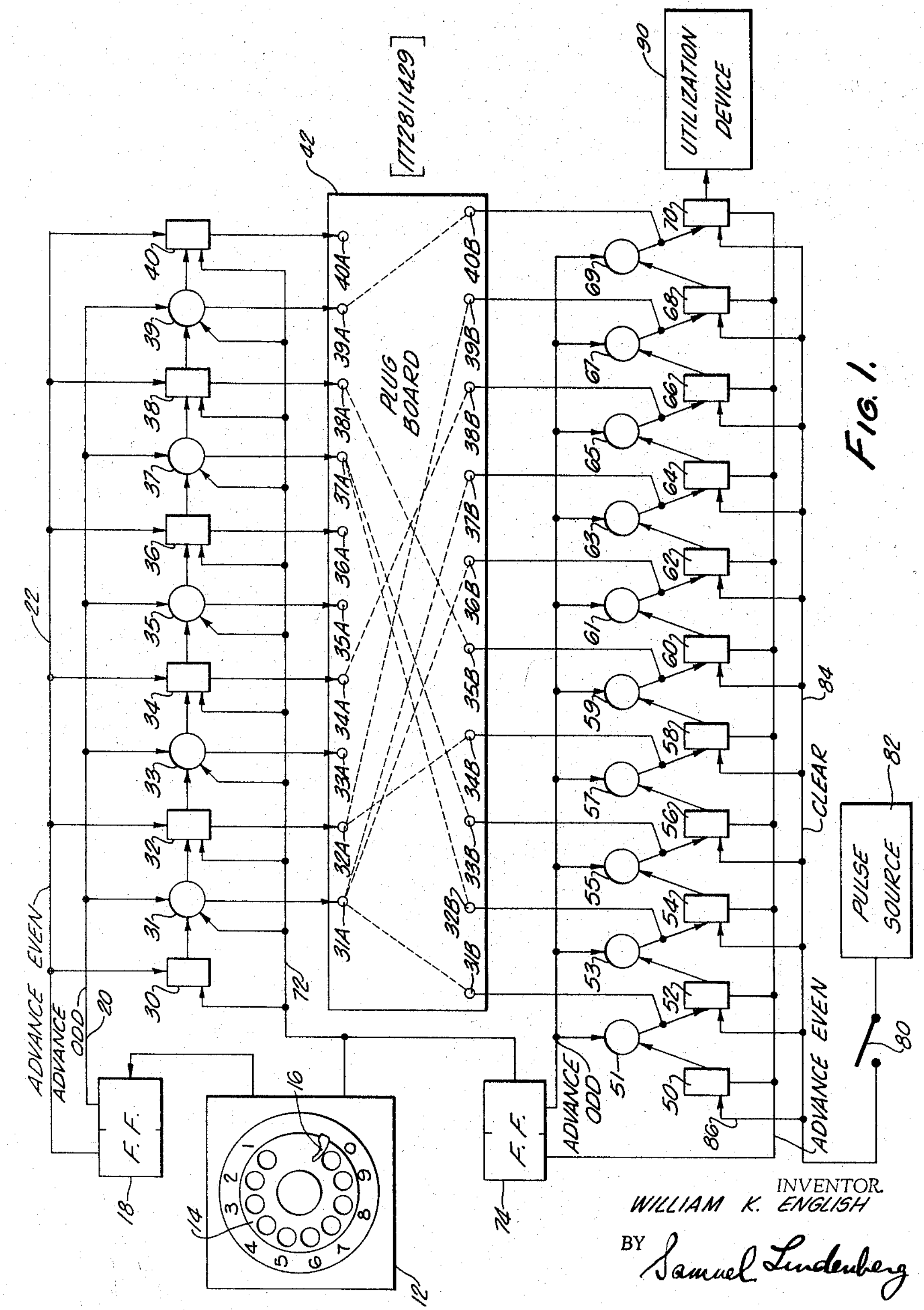
FIGURE 1 is a schematic logic diagram of the embodiment of the invention.

Reference is now made to FIGURE 1 which is a schematic logic diagram of an embodiment of this invention. As has been pointed out, this invention detects a predetermined number sequence. Each number in the predetermined sequence may be represented by a number of pulses in a pulse train. In FIGURE 1 there is shown, by way of example of a pulse train generator, a dial device 12. This dial device is akin to a telephone dialing apparatus whereby inserting the finger in one of the holes in a disc 14, the disc is rotated to a stop 16. The dial is spring biased to return to its predetermined position. In returning to said position it emits into the output line a number of pulses corresponding to the position of the aperture which was brought to the stop 16.

The pulse train output from the dial pulse device 12, is applied to a flip-flop circuit 18. This circuit has two stable states, as is well known, and is advanced from one to the other of its stable states in response to successive pulses applied to its input from the dial device 12. An advance odd core line 20, receives a drive current when the flip-flop 18 is in one of its stable states, and advance even core line 22, receives a drive current when the flip-flop 18 is in the other of its stable states. A shift register which will hereafter be designated as a number register, contains a number of magnetic cores in accordance with the largest number in the number sequence which it is desired to detect. By way of illustration, 11 of these cores respectively 30 through 40 are employed. The even cores of the shift register are represented by the rectangles respectively 30, 32, 34, 36, 38, 40. The odd cores are represented by the circles respectively 31, 33, 35, 37, 39. The advance even winding drives the even cores to their clear states when it is energized by the flip-flop 18. The advance odd winding 20, drives the odd cores to their clear states of magnetic remanence when the winding 20 is energized from the flip-flop 18.

Figure 2:
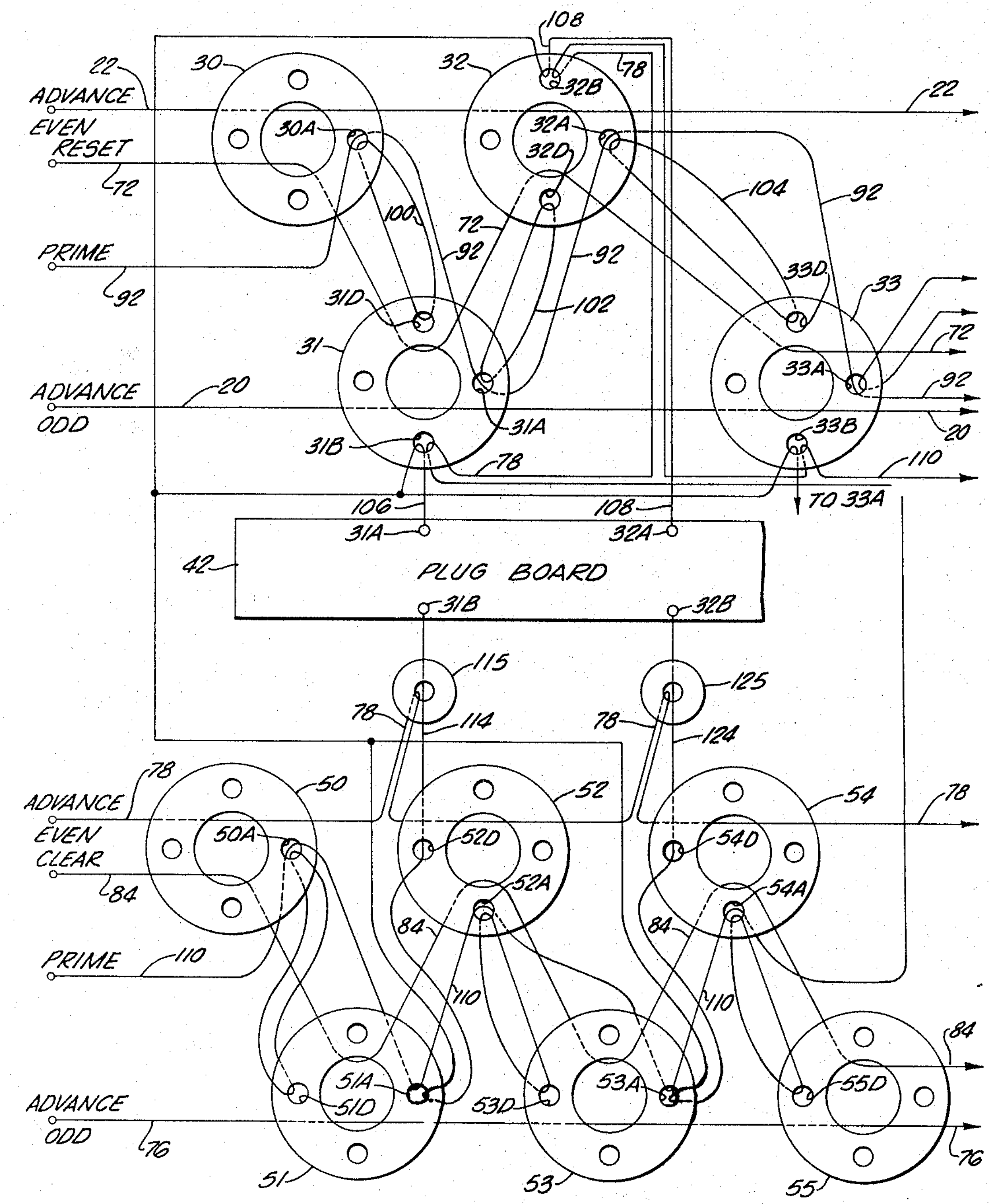
FIGURE 2 is a circuit diagram illustrative of a number register and of a digit register which may be used in the embodiment of the invention.

The shift register comprised of magnetic cores 30 through 40, as will become more clear when the circuit diagram of FIGURE 2 is described, may be any of the well known types of magnetic core shift registers and operates in a manner well known for the shift registers. The distinction here is that besides each one of the magnetic cores having its output applied to the succeeding magnetic core in the shift register, another output is derived from each of the cores except, the first. This output from each core is connected to a separate terminal respectively 31A through 40A of a plug board 42.

Besides the dial pulse device 12, providing a sequence of pulses in a number pulse train, when the dial 14, is first actuated, it produces a reset pulse which is applied to a reset line 44, and at the end of the sequence of pulses which are emitted, a second reset pulse output is applied to the reset line 44. The reset pulse output drives the first core of the number register to its set state. The reset pulse output is also applied to a reset winding 72, which is coupled to all of the cores in the number register but the first. The reset pulse drives to its clear state whichever one of the cores in the number register (except the first) is in its set state.

The dial pulse device 12, as soon as it is actuated, provides a reset pulse. Thereafter, a number pulse train is emitted in accordance with the opening in dial 14 which has been brought to the stop 16. Thereafter, a second reset pulse is emitted. As previously indicated, a dialing device for providing these outputs may be a dial for a telephone, or may comprise a stepping switch which is manually actuated to select a desired number of pulses and then automatically homes while providing the outputs indicated by contacting terminals provided for the purposes mentioned.

The digit register, by way of example, is composed of 21 magnetic cores respectively 50 through 70. The magnetic cores in the digit register are also represented by rectangles when they are the even numbered cores in the sequence of the register and by circles when they are the odd numbered cores in the sequence of the register. The reset pulse output of the dial pulse device 12 is applied to a flip-flop circuit 74. This flip-flop circuit is successively driven between its two stable states. In one of its stable states it will drive an advance odd winding 76. This winding is coupled to all of the odd numbered cores in the digit register and drives them to their clear states. The other output of flip-flop 74, applies current to an advance even winding 78. This winding drives all of the even cores in the digit register to their clear state. It will be appreciated that in both the number register and in the case of the even cores in the digit register, any one of the cores which is in its set state, when driven to its clear state, will transfer the set state to the succeeding core. Since a clear drive is applied to every single core in the register simultaneously, all cores will be driven to their clear states.

It will be seen that the plug board 42, has output terminals respectively designated as 31B through 40B. Each one of these output terminals is coupled in an And gate fashion with an output from an associated one of the odd cores 51 through 69 so that the succeeding even core will not be driven to its set state unless both of the indicated inputs are present. It should be noted that the logical symbol for the And gate is represented by the junction of a lead, for example, the one extending from terminal 31B with the lead extending from the odd core 51 to the even core 52. The winding arrangement and magnetic core disposition will become more clear with an explanation of FIGURE 2 subsequently herein. At this point it will suffice to understand that in order for an odd core in the digit register to drive a succeeding core to its set state in response to energization of the advance odd winding 76, both the odd core must have been in its set state and the terminal of the plug board with which the output of the odd core is connected in And gate fashion, must be connected to a core in the number register which was in its set state.

It is believed that the operation of the invention will be made clear by an explanation of its operation to detect a portion of a definitive sequence. Such a sequence, given by way of example, and not by way of limitation, may comprise the following number sequences; 1772811429. The system is set up to detect this number sequence by connecting the terminals 31A through 40A which respectively correspond to the numbers 1 through 10 to terminals 31B through 40B, also corresponding to numbers 1 through 10 in the order desired for detecting the number sequence. Thus, terminal 31A corresponding to number 1 is connected to terminal 31B as represented by the dotted line between the two terminals. Terminal 37A, representing the number 7, is connected to both terminals 32B and 33B, since next there are two 7's in the sequence. Terminal 32A corresponding to the number 2 in the sequence is connected to terminal 34B which corresponds to the fourth number to be detected in the sequence. The fifth number to be detected in the sequence which is 8, requires that a connection be made between terminals 38A and 35B. The remaining connections for the sequence are made between terminal 31A and terminals 36B and 37B, between terminal 34A and terminal 38B, between terminal 32A and terminal 39B, between terminal 39A and terminal 40B.

Before the dial pulse generating device 12 is actuated a switch 80 is momentarily closed to enable a pulse from a source 82 to be applied to a reset line 84, which is connected to all of the cores 51 through 70 for the purpose of driving them to their clear states. The pulse source 82 is also connected to a line 86 through which the pulse source is enabled to drive the first core in the respective number and digit register to its set state. Then the dial pulse device 12 may be actuated. The first output from the dial pulse device is a first reset pulse which sets core 30 and is applied to clear all of the cores in the number register except the core 30, and is also applied to the flip-flop 74 to cause it to energize the advance even winding 78, whereby the set state of the core 50 is transferred to the core 51. When the dial 14 is released, one pulse is emitted for driving flip-flop 18 to energize the advance even winding 22, whereby the set state of core 30 is transferred into core 31. Then a reset pulse is emitted from the dial device 12. The effect of this reset pulse is to drive core 31 to its clear state and to drive flip-flop 74 to cause an energization of the advance odd winding 76. Since the plug board terminal 31A is connected to the plug board terminal 31B, there is a coincidence of outputs from cores 31 and 51, whereby core 52 will be driven to its set state. It will be appreciated that if the plug board did not have these terminals 31A and 31B interconnected then magnetic core 52 would not be driven to its set state and the sequence detection operation would be aborted. Should some other number than 1 have been dialed by the dial pulse device 12, then the coincidence conditions required for driving magnetic core 52, would not be provided and the sequencing of the set state of cores through the digit register which is required for detecting the desired sequence does not occur.

Assume now that the second digit which is dialed is a 7. The reset pulse out of the dial pulse device 12, drives core 30 to its set state and causes flip-flop 74 to energize the winding 78 whereby the set state of core 52 is transferred to core 53. The succeeding seven pulse outputs from the device 12, drive the flip-flop 18 to alternately energize the advance even and advance odd windings, respectively 22 and 20, whereby the set state of core 30 is transferred to core 37. The second reset pulse out of the dial pulse device 12, clears core 37 whereby its output is applied to the plug board terminal 37A. Plug board terminal 37A is connected to plug board terminal 32B which in turn is "Anded" with the output of core 53. The second reset pulse drives flip-flop 74 to the state at which it will energize the winding 76. Accordingly, core 54 can be driven to its set state.

Again, if the second digit which is dialed by the device 12 were not a 7 or if the plug board did not connect the 7th terminal 37A to the second terminal 32B, then the sequence detection operation could not proceed.

If the third number which is dialed is a 7, the invention operates in the manner previously described so that when the core 37 is driven to its clear state by the second reset pulse output applied to winding 72, the output which occurs from core 55, in response to the second reset pulse output and the output from core 37 which is derived from terminal 33B together are used to drive core 56 to its set state.

The fourth digit in the specified sequence is a 2. This requires that the terminal 32A which is connected to the second core in the number register sequence be connected to the fourth terminal 34B, on the output side of the plug board. Accordingly, when the number 2 is dialed in the device 12, the first reset pulse clears the number register, drives core 30 to its set state, and transfers the set state of core 56 into core 57. The two pulses which are then produced by the dial device 12, transfer the set state of core 30 into core 32. The second reset pulse then clears core 32 applying its output to terminal 34B. The output derived from terminal 34B with the output derived by the clearing drive applied from the advance odd winding 76 to core 57 are sufficient to drive core 58 to its set state.

The detection of the sequence progresses in the manner indicated transferring the set state of the cores in the digit register to the last core 70, which upon being set indicates by its output that a successful sequence detection has occurred. The output of core 70 is applied to a utilization device 90, to perform whatever operation is required upon the detection of a successful sequence. Switch 80 may be energized at the end of a detection operation to establish conditions for the next sequence detection operation.

FIGURE 2 is a circuit diagram showing the input two stages of the number register and the digit register. The remaining portion of the circuitry of these registers are redundant with the circuit shown in FIGURE 2 and therefore will be omitted. The magnetic cores and the windings which perform the identical functions as those described in FIGURE 1 are given the same reference numerals in FIGURE 2. The magnetic cores shown in FIGURE 2 are of the multi aperture type having a central or main aperture and minor apertures in the ring of magnetic material surrounding the central aperture. The magnetic cores preferably have substantially rectangular hysteresis characteristics and will have two principal states of magnetic remanence respectively designated as the clear state and the set state. A magnetic core which is in the set state can be "primed." This is a well understood operation in which the direction of the magnetic flux which circulates around one of the minor apertures, when the magnetic core is in its set state, is reversed by the application of a priming current to a priming winding.

In FIGURE 2 a priming winding 92 is coupled to the minor apertures on each one of the magnetic cores respectively 30, 31, 32, 33, which are used to provide an output from the core operating as a shift register when it is driven to its clear state. Thus, the priming winding 92 passes through the output aperture 30A of magnetic core 30. It then passes through output apertures 31A of magnetic core 31, thereafter through output apertures 32A of magnetic core 32 and thereafter through output apertures 33A of magnetic core 33. It should be noted that the priming winding 92 may continuously have the direct current applied thereto for the purpose of priming any one of the cores which have been driven to their set states, or may be pulsed to apply a priming drive after a core has been driven to its set state. All of these techniques are well known in the art of magnetic core shift registers.

The advance even winding 22 is coupled to all the even numbered cores in the number register by passing through their main apertures. The advance odd winding 20 is coupled to all the odd numbered cores by passing through their main apertures. A first transfer winding 100 is coupled between cores 30 and 31 by passing through the minor aperture 30A of core 30 and the minor aperture 30D of core 31. A transfer winding 102 couples the output of core 31 to core 32 by passing through the minor aperture 31A of core 30 and a minor aperture 32D of core 32. A transfer winding 104 couples the output of core 32 to core 33 by passing through the minor aperture 32A of core 32 and the minor aperture 33D of core 33.

The reset winding 72 is coupled to all the cores of the number register by passing through the main apertures of all of these cores. However, this winding passes through the aperture of core 30 with a winding sense to drive this core to its set state when the winding is energized and is coupled to the remaining cores of the register with a winding sense to drive these cores to their clear states when energized.

Each one of the odd cores of the register has an additional output winding, such as winding 106 which is coupled to the minor aperture 31B of core 31, and winding 108 which is coupled to the minor aperture 33B of core 33. These are the windings which are connected to the plug board terminals. One end of these windings is connected to a common terminal and the other end to the allocated plug board terminal.

The digit register also comprises a plurality of multiaperture magnetic cores which are arranged in a similar fashion to the number register. In addition for each even core there is provided a magnetic toroid core 115, 117, to assist in providing the "And" function. The priming winding 110 passes through the minor output apertures of each one of the cores in order to prime each one of the cores which has been driven to its set state. It also passes through the output apertures of the number register which are coupled to the plug board. Thus, the prime winding 110 passes through the minor aperture 50A of core 50, through the minor aperture 51A of core 51, through the minor aperture 52A of core 52, through the minor aperture 53A of core 53, through the minor aperture 54A of core 54, etc. Thereafter it passes through the B minor apertures of all of the cores in the number register including 31B and 32B. The clear winding 84 passes through the main aperture core 50 with a sense to drive this core to its set state when this winding is energized and thereafter passes through the remaining cores of the register to drive these cores to their clear states when energized. The advance even winding 78 and the advance odd winding 76, are respectively coupled to the even and odd cores of the register to drive these cores to their clear states when these windings are energized. In addition the advance even winding is coupled to the "And" cores 115, 117 . . ., to drive these cores to their clear states.

A transfer winding 112 couples the output of core 50 to core 51 by passing through the minor aperture 50A of core 50 and the minor aperture 51D of core 51. A transfer winding 114 has one end connected to the common terminal. It is then wound on core 51 passing through minor aperture 51A, then coupling to core through minor aperture 52D on core 52. The winding is then coupled to core 115 and thereafter is connected to terminal 31B of the plug board. A transfer winding 116 transfers the output of core 52 to core 53. It passes through the minor aperture 52A of core 52 and through the minor aperture 53D of core 53.

A transfer winding 124 has one end connected to the common terminal. It is then coupled to cores 53 and 54 passing in succession through the minor aperture 53A of core 53 and the minor aperture 54D of core 54. The winding is then coupled to "And" core 125 and then is connected to its allocated plug board terminal 32B. The output of core 54 is coupled to core 55 by a transfer winding 120. It passes through the minor aperture 54A of core 54 and the minor aperture 55D of core 55.

In the example which was given to illustrate the operation of the embodiment of the invention, the output of core 31 was connected by means of the plug board in "And" gate fashion with the output of core 51. This would require the winding 106 in FIGURE 2 to be connected by the plug board with the winding 115. Effectively, this means that core 52 will be driven only in response to an output from both cores 31 and 51. The common output winding now established by the plug board connection for cores 31 and 51 is wound on these cores with a sense to add their outputs, and is wound on core 115 with a sense so that core 115 is driven to its set state by an output from either core 31 or core 51. Core 115 is selected so that in the presence of an output from either core 31 or 51 it will absorb the flux resulting and none will be available for driving core 52. Both cores 31 and 51 must be driven to their clear states from their primed set states substantially simultaneously to produce an output which drives core 115 to its set state and has enough left to drive cores 52 to its set state. Therefore, a logical "And" arrangement is provided with the magnetic cores whereby an even core in the digit register will not be driven into its set state in response to an output from a preceding odd core alone in the digit register or from one of the odd cores in the number register which is coupled thereto by means of the plug board.

Accordingly, there has been described and shown herein a novel, useful and unique arrangement for a magnetic core sequence detector which can be readily altered to detect any prearranged sequence of numbers. Although the source of pulses is shown as a dial device, it will be appreciated that this is merely by way of example of a pulse source which provides trains of pulses representing numbers in the sequence it is desired to be detected. This could be pulse trains coming out of the telephone system, by way of example, for selecting a particular subscriber's telephone. Alternatively, these pulse trains could have alphanumeric significance whereby a particular code may be decoded. Here the pulse source may be a magnetic tape on which the pulses are recorded. The magnetic tape may be read and its output applied to a number of the arrangements herein in parallel simultaneously for deriving the intelligence recorded on the magnetic tape. Furthermore, although the embodiment of the invention has preferably been shown and described as employing magnetic core shift register the principles herein may be used with shift registers employing transistors or vacuum tubes in each stage. Accordingly, this invention is to be limited only by the spirit and scope of the claims herein.

I claim:

1. A system for detecting a predetermined sequence of numbers each of which is represented as a serial pulse train wherein said serial pulse trains are emitted serially from a pulse source, said system comprising a first and a second shift register, each of said shift registers including a plurality of stages arranged in a serial sequence, each of said stages having an off state and an on state, each of the stages of said first shift register having a first output winding coupling a stage to a succeeding stage in said shift register for transferring the on state of the preceding stage to a succeeding stage, each of said stages in said first shift register having a second output winding, each alternate stage in said second shift register including first output winding means coupling alternate ones of the stages of said second shift register to the succeeding remaining ones of the stages of said second shift register for transferring the on state of an alternate one to a remaining one of said shift register stages, each remaining stage of said second shift register including a second output winding means, means for selectively coupling the second winding of each stage in said first shift register to a separate second output winding means of said second shift register in accordance with a predetermined number sequence desired to be detected, and means for coupling each coupled second winding and second winding means to the alternate stage of said second shift register succeeding the remaining stage having the second winding means for driving said succeeding remaining stage to its on state only in the simultaneous presence of outputs from the stages coupled to said succeeding stage when said stages are driven from their on to their off states.

2. A system as recited in claim 1 wherein each of said shift register stages comprises a multiaperture magnetic core having one state of magnetic remanence corresponding to an off state and a second state of magnetic remanence corresponding to an on state.

3. A system for detecting a predetermined sequence of numbers each of which is represented as a serial pulse train wherein said serial pulse trains are emitted serially from a pulse source, said system comprising a first and a second shift register, each of said shift registers including a plurality of stages arranged in a serial sequence, each of said stages comprising a magnetic core having an off state and an on state of magnetic remanence, a separate first transfer winding coupling each core of said first shift register to a succeeding core, a separate first output winding wound on each core of said first register, a separate second transfer winding coupling every even core in said second shift register to every odd core in said second shift register, a separate second output winding wound on each odd core of said second shift register, means for driving the first core in said first and in said second shift registers to their on state, means for applying a pulse train to said first shift register from said source to advance the on state of said first core to a core having a relative position in said first shift register stage sequence corresponding to the number of pulses in said pulse train, means for transferring the on state of said first core in said second shift register to a succeeding core in said second shift register and for simultaneously clearing said first shift register, means for selectively connecting together said first and second output windings in accordance with the predetermined number sequence desired to be detected, and means for coupling each said connected together first and second windings to an even core succeeding the odd core on which said second output winding is wound for transferring the on state of said odd core to said even core only in the presence of a simultaneous output from both cores to which said first and second output windings are coupled.

4. A system as recited in claim 3 wherein the magnetic cores of said first and second shift registers are multiaperture cores each having an input aperture and a first and second output aperture, each said first transfer winding passes through the first output aperture of a preceding core and through the input aperture of a succeeding core in said first shift register, each said first output winding passes through the second output winding of each core in said first shift register, each said second transfer winding passes through the first output aperture of an even core and the input aperture of a succeeding odd core in said second register, each said second output winding passes through a first output aperture of each odd core in said second shift register.

5. A system as recited in claim 3 wherein said means for selectively connecting together said first and second output winding in accordance with the predetermined number sequence desired to be detected comprises a plugboard having first terminal means for each first output winding and to which one end of each first output winding is connected, second terminal means for each second output winding and to which one end of each second output winding is connected, and means for connecting each first terminal means to a second terminal means in accordance with the predetermined number sequence.

References Cited

UNITED STATES PATENTS

| | | | |
|---|---|---|---|
| 2,648,831 | 8/1953 | Vroom | 340—164 |
| 3,012,226 | 12/1961 | Abbott | 340—164 |
| 3,046,526 | 7/1962 | Scanlin | 340—164 |
| 3,064,236 | 11/1962 | Coleman | 340—164 |
| 3,080,547 | 3/1963 | Cooper | 340—164 |
| 3,201,756 | 8/1965 | Young | 340—164 |
| 3,226,679 | 12/1965 | Malone | 340—164 |

NEIL C. READ, *Primary Examiner.*

P. XIARHOS, D. YUSKO, *Assistant Examiners.*